INVENTOR.
E. B. BENJAMIN
BY
C. A. Gulbrandsen
ATTY.

INVENTOR.
E. B. BENJAMIN
BY
C. A. Gulbrandsen
ATTY.

July 26, 1960 E. B. BENJAMIN 2,946,857
COMPACT WALL TELEPHONE MOUNTING
Filed April 28, 1958 3 Sheets-Sheet 3

INVENTOR.
E. B. BENJAMIN
BY
C. A. Gulbrandsen
ATTY.

United States Patent Office 2,946,857
Patented July 26, 1960

2,946,857

COMPACT WALL TELEPHONE MOUNTING

E. Burton Benjamin, Chicago, Ill., assignor to Automatic Electric Laboratories, Inc., a corporation of Delaware Filed Apr. 28, 1958, Ser. No. 731,508

5 Claims. (Cl. 179—100)

This invention relates to subscribers telephones and more particularly to wall-mounting telephones of a compact type.

The telephone as shown herein is of generally the type shown in United States Patent No. 2,152,494 issued March 28, 1939, to H. F. Obergfell, having a dial mounted atop a compact housing and a handset resting on a hookswitch arm alongside the housing.

The present invention however has a dial mounting which may be rotated within its casing to any one of an infinite number of positions encompassing 360° of possible rotation. The dial mounting may be further pivoted vertically to regulate the angle of incline of the dial face. Also the hookswitch may be rotated to one of a finite number of positions within a 180° rotation arc. Thus, the present telephone may best be described as a universal mounting, compact wall telephone. This telephone allows its component parts to be adjusted for mounting in any number of possible locations. The adjustment presumably is fixed in position on installation of the telephone and most probably would remain in that adjustment. If the phone is to be placed in a new location, the same parts may be adjusted for the new location whatever its relative position, and no new parts, brackets or other essentials are required.

The object of this invention is to provide a compact wall telephone of minimum size, capable of being mounted in any number of locations and have the critical component units capable of adjustment to any of these locations. The telephone requires no additional or different parts for the change of mounting since all changes in position are achieved internally in the telephone housing.

A feature of the invention consists of a ball and socket joint between the dial swivel mount and the telephone housing which allows rotation of the entire dial in a horizontal plane and adjustment of the angle of inclination of the dial face in a vertical plane.

A further feature consists of a hookswitch position adjustment for allowing the hookswitch and its appendant handset to be placed in any one of a finite number of rotary positions encompassing 180° of arc. The hookswitch is locked in any one of these positions by the use of a rotary plate internal to the housing, the plate having a series of peripheral grooves adapted to engage a shoulder protruding from the housing base.

Referring to the drawings.

Figure 1:
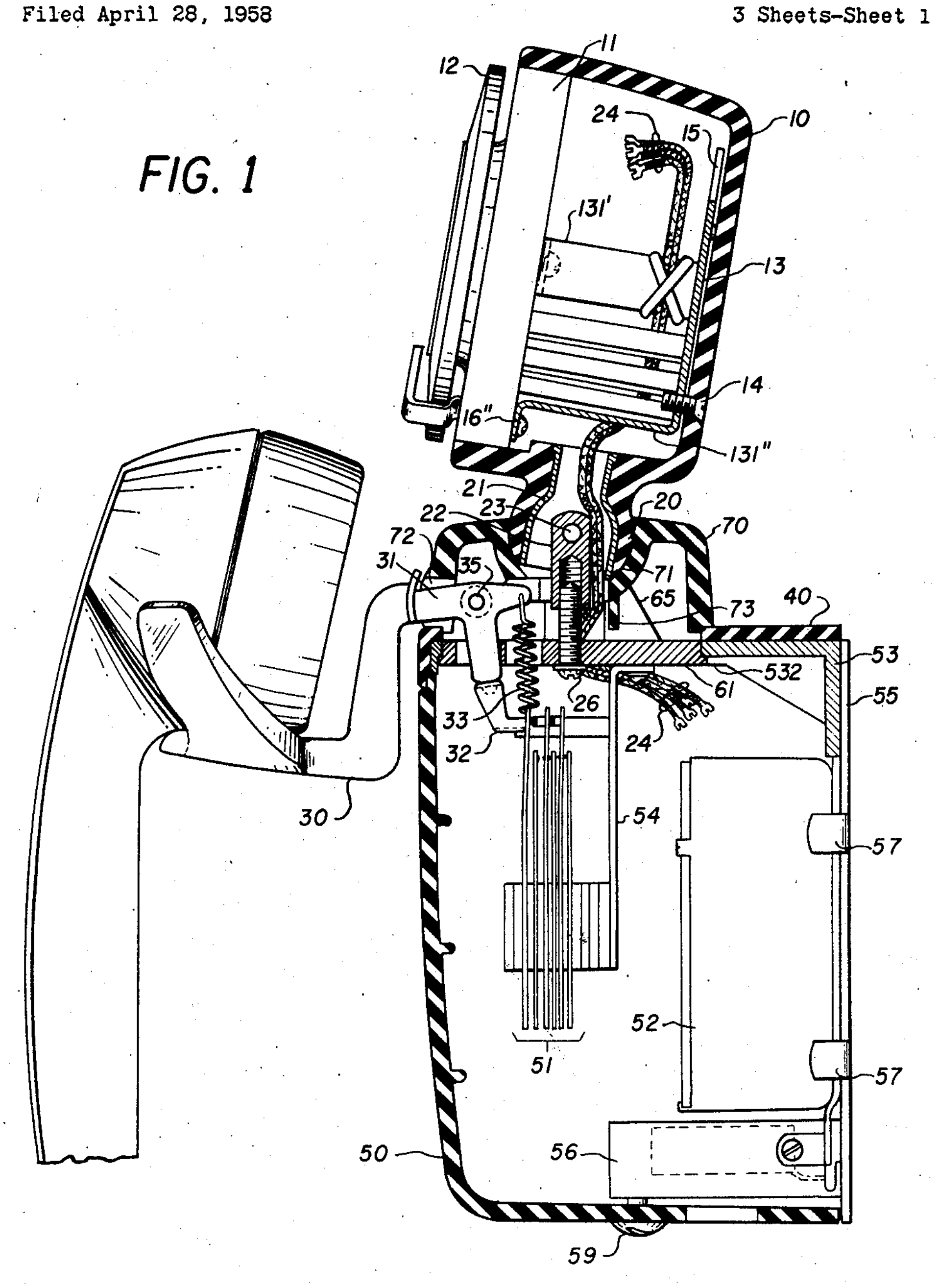
Fig. 1 shows a cutaway section of the main housing combined with a side view of the hookswitch and dial mounting.
Figure 2:
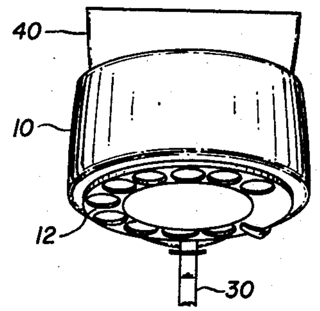
Figs. 2, 3, 4 and 5 show some of the various positions of dial mounting possible relative to the main housing.
Figure 5:
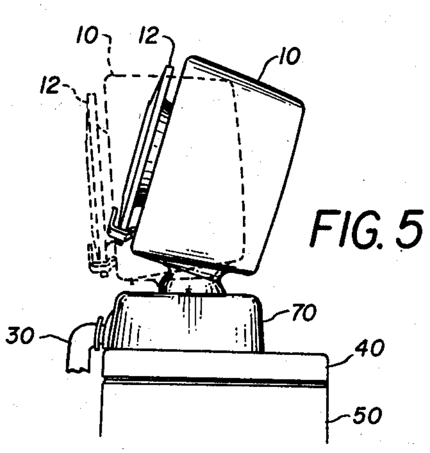
Figure 3:
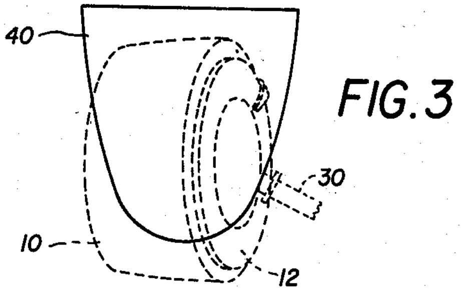

Shown in Fig. 1 is dial mount 10 having at its lower extremity ball 20. The dial mount and ball are molded as a single unit of a suitable plastic such as one of the cellulose-acetate compounds. A standard dial, shown generally with dial base 11 and external finger wheel 12, is mounted to the dial mount 10 by the use of a backing plate 13. The backing plate 13 is formed of a suitable thin sheet metal and has a solid back section and a series of extensions (131–135, 131′–135′, and 131″) formed at right angles to the back section. These extensions are spaced about the periphery of the back section and cover approximately 180° of the circumference of the plate 13. Three of these extensions (131, 131′, and 131″) have formed at their outer extremities ears or lugs (16, 16′, and 16″ respectively). These lugs are used to mount the backing plate to the dial base as shown in Fig. 1. Thus the upper portion of the backing plate is simply a plate extending upward to provide a plate for mounting of the dial to the dial mount 10. Shown in Fig. 1 is lower screw 14 which fits into a countersunk hole in the mount 10 and is tightened into a threaded hole 17. Two other tapped holes 17 are spaced about backing plate 13 to serve the same purpose. Notch 15 is provided to allow the terminal screws of the dial to be accessed readily.

The lower end of dial mount 10 has the ball 20 as mentioned. The ball is a hollow one having a metal insert 21 forming the inner wall of the cavity. Stud 22 is pivotally mounted in the ball by means of pivot pin 23 which is secured through the ball. Stud 22 is internally threaded and extends past the lower extremity of the ball. The cavity as defined by insert 21 allows for movement of stud 22 to a limited degree as shown. There is also sufficient room for wires 24 from the dial to be threaded for connection to the terminals of spring pileup 51 and for connection to the required outgoing terminals which are placed in enclosure 52. Within enclosure 52 may also be mounted the transmission circuit components, such as: resistors, condensers and induction coil.

Figure 6:
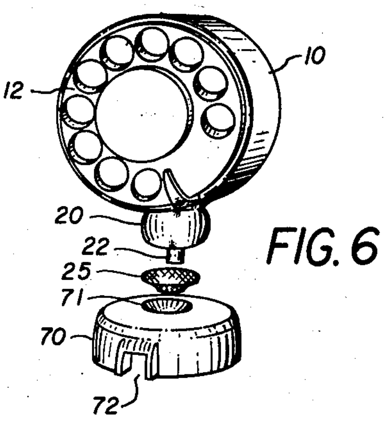
Fig. 6 shows an exploded view of the ball and socket joint.
Figure 4:
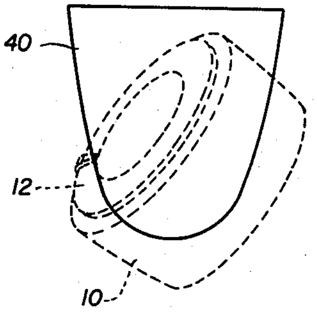

The socket unit 70 which includes seat 71 for the ball 20 is shown in Figs. 1 and 6. The socket unit has a notch 72 to allow the hookswitch arm 31 to extend through the socket unit. The socket further has an integral extension arm 73 which extends downward into the space between the lugs 63 and 65 of swivel base 60 to firmly lock the socket 20 to the swivel base 60.

Figures 7, 8:
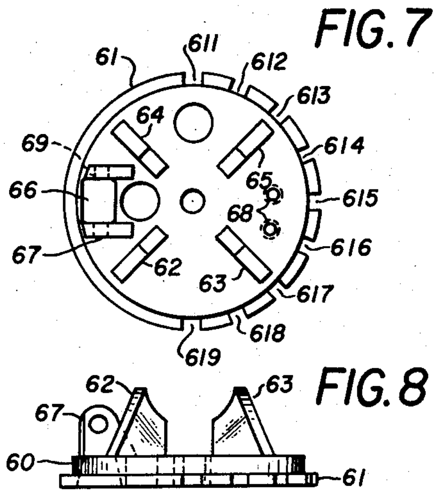
Figs. 7 and 8 show a top and side view respectively of the swivel base plate.
Figure 10:
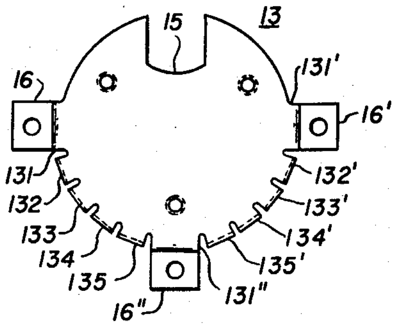
Figs. 10 and 11 show a top and side view of the dial backing plate.
Figure 11:
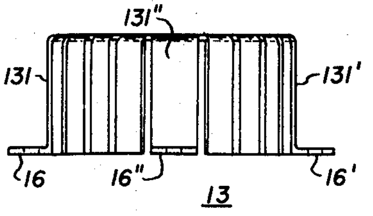
Figure 9:
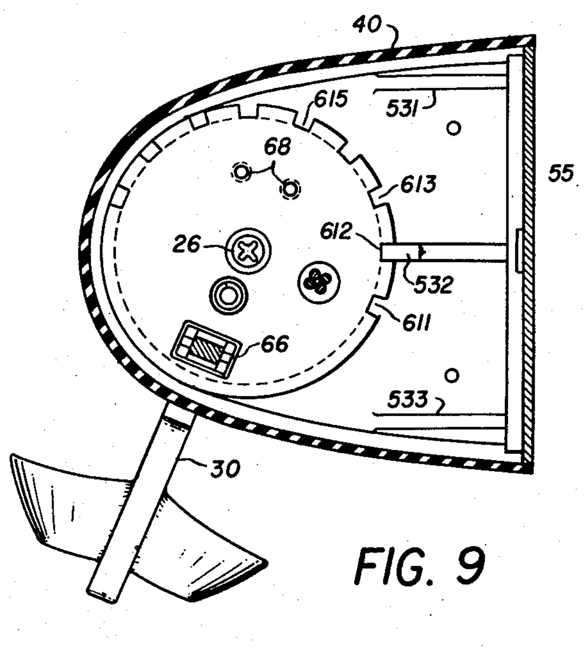
Fig. 9 shows a bottom view of the base plate as mounted in the main housing and its interrelations to the hookswitch and the housing.

The base plate 60 as shown in detail in Figs. 7, 8 and 9 consists of a two layer plate having lugs 62, 63, 64 and 65 protruding axially from its upper surface. Also lugs or shoulders 67 are shown each at the sides of cavity 66. These shoulders each have a small hole 69 near their upper edge to pivot therein the hookswitch arm 31. The plate 60 has drilled through it two holes, one to provide a passage for the dial wires 24 and another to allow hookswitch return spring 33 to extend through the plate. Also a pair of tapped holes 68 are provided in the plate by which spring pileup 51 may be mounted as shown in Fig. 1.

The lower layer 61 of plate 60 extends radially beyond the periphery of the upper layer and has a series of equispaced notches 611–619 indented in the periphery of plate 61. These notches are spaced in an arc of 180°.

In Figs. 1 and 9 the use of these notches are shown. Fig. 9 is a view of the plate 60 viewed from below. In this figure is shown the plate 60 having its notches 611–619. Notch 612 is shown having nested within it shoulder 532 of base plate 53 which would lock the hookswitch arm 31 in the position shown in Fig. 9. The relationship of the handset holder 30 of the hookswitch to the plate 60 is fixed by the location of slot 66 and lugs 67. The hookswitch as mentioned is pivoted by means of a pin 35 through the holes in lugs 67. The hookswitch extension extends through slot 66 to reach its follower 32.

By loosening the screw 26, the plate 60 may be rotated to any one of its nine possible positions thus locating the position of the handset holder 30. Thus in Fig. 1, the handset may be positioned directly in front of the housing. This position would have the shoulder 532 engaging notch 615. After the hold screw 26 is tightened the hookswitch location is positively fixed. A curved wire mesh screen 25 (Fig. 6) is used as a form of lock washer between the ball 20 and socket seat 71 so that the ball may not be rotated without loosening hold screw 26. As pointed out previously the position of the socket unit 70 is also determined by the position of swivel base 60 due to the fitting of the socket extension into the gap between ears 63 and 65 and the fit of notch 72 about lugs 67.

The remainder of the structure consists of a spring pileup 51 to which wires 24 are attached when the phone is to be installed. The pileup and the hookswitch perform a generally known function. The rear wall of the housing structure consists of a flat plate 55 of suitable metal to which are affixed potentiometer 56 and terminal box or transmission unit 52.

The front housing shell is placed around the unit and located properly along the outside of locators 57 which protrude from each side of the back plate 55. The back plate is mounted against the surface to which the unit is to be affixed. This surface may be a wall, desk, bed headboard, or any place where a telephone is required. Two screws are used to hold the shell 50 firmly to the back plate. These screws are held in tapped holes in the lower surface of the potentiometer 56 mounting plate.

Figure 12:
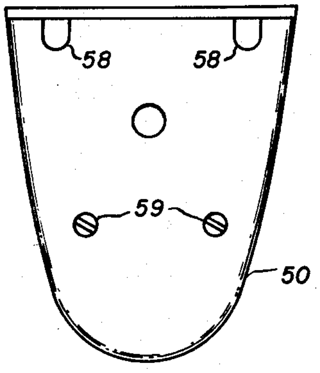
Fig. 12 shows a bottom view of the housing shell.

Shown in Fig. 12 is the bottom view of the housing with notches 58 provided on either side to allow the handset cord to be extended from the nearest side to the handset as located.

It may be seen that the hookswitch and its handset may be placed in any one of nine positions through an arc of 180° and affixed in place. Further due to the ball and socket relationship the dial mount may be swivelled in any position through the entire circular arc of 360°. Also due to the ball and socket, the angle of inclination of the dial face with respect to the vertical may be adjusted through an arc of approximately 15° forward and 20° back. It should be noted that all these adjustments are independent of one another and each may be adjusted as seen fit.

In this manner a universal wall phone may be achieved having the same parts and yet mounted permanently in place (by tightening screw 26) in any position desired by the subscriber at installation.

What is claimed is:

1. A compact housing for a wall telephone having a dial mount, a dial face exposed from one side of said mount and a ball extending from said mount, a socket on said housing for nesting said ball in any one of an infinite number of positions in an arc of 360°, a hookswitch arm extending from said housing, means for positioning said hookswitch arm in any one of a finite number of planar positions, said positioning means including a stationary rib, a rotary plate having a number of peripheral notches, each of said notches individually capable of nesting therein said rib, said hookswitch having a follower for operating a spring pileup, a cutout in said rotary plate for engaging said follower to thereby fix the position of said hookswitch arm relative to said rotary plate, said notch to rib engagement determining the position of the plate relative to the housing, a slot in said socket for holding said hookswitch arm and for positioning said socket relative to said hookswitch arm.

2. A compact housing for a wall telephone having a dial mount, a dial face exposed on one side of said mount and a ball extending downward from said mount, a socket rotatably mounted to said housing for nesting therein said ball in any one of an infinite number of positions and thereby position the exposed dial face in any one of an infinite number of planar positions, said ball and socket further allowing said dial face any one of a number of positions in restricted angle of inclination, a hookswitch extending from said housing, means for positioning said hookswitch in a finite number of planar positions, said positioning means including a stationary rib, a rotatable plate having a plurality of peripheral notches, each of said notches individually capable of nesting said rib to position the rotary plate relative to the housing.

3. In a mounting for telephone handsets, the combination of a compact wall-mounted housing, a switch hook mechanism mounted therein having a handset carrying arm extending externally from said housing, means for positioning said handset arm in any one of a number of positions encompassing 180° of arc, said arc positions including the left side of said housing, the front of said housing, the right side of said housing and a plurality of positions therebetween, means cooperatively engaging said positioning means to lock the switch hook in one of said positions to prevent rotation of the switch hook arm.

4. A compact housing for a wall type telephone having a dial supported on said housing, said dial having an exposed face, means for locating said dial face in any one of a number of positions encompassing 360° of arc, said locating means further locating said dial face in any one of a number of angles of inclination to said housing, said locating means comprising a mount for said dial having a hollow ball at its lower extremity, a socket appended to said housing for mating with said ball and for containing said ball, means for maintaining said dial face in one of said positions comprising a tapped stud pivoted within said ball and extending therefrom through said socket, a screw within said housing for engagement with said stud for frictionally holding said ball from movement with said socket.

5. A compact housing for a wall mounted telephone, said housing having a dial mounted thereon to rotate to any one of a number of positions, a hookswitch arm for holding a telephone handset extending from said housing, said arm rotatable to assume one of a number of planar positions, means for locking said hookswitch arm and dial relative to said housing, said locking means comprising a circular plate having a number of evenly spaced teeth, a stationary rib for meshing with a gap between adjoining teeth on said plate for maintaining the position of the plate relative to the housing, a pair of vertical extensions on said plate for pivoting said hookswitch arm, said plate thereby maintaining the position of the hookswitch arm relative to the housing, said plate further providing a backing surface for the head of a screw for tightening the plate and hookswitch arm in one of the planar positions.

References Cited in the file of this patent

UNITED STATES PATENTS

| | | |
|---|---|---|
| 2,152,494 | Obergfell | Mar. 28, 1939 |
| 2,337,381 | Fischer | Dec. 21, 1943 |

FOREIGN PATENTS

| | | |
|---|---|---|
| 881,063 | Germany | June 25, 1953 |